United States Patent
Peng et al.

(10) Patent No.: US 10,351,158 B2
(45) Date of Patent: Jul. 16, 2019

(54) HEATING AND COOLING DEVICE FOR HANDLES

(71) Applicant: GENTHERM AUTOMOTIVE SYSTEMS (CHINA) LTD., Langfang Hebei (CN)

(72) Inventors: Steve Fubing Peng, Langfang (CN); Jonathan Yu Zhang, Tianjin (CN); Fred Fufei Zhang, Langfang (CN); Melinda Meijing Hu, Langfang (CN)

(73) Assignee: GENTHERM AUTOMOTIVE SYSTEMS (CHINA) LTD., Langfang Hebei Prov. (CN)

( * ) Notice: Subject to any disclaimer, the term of this patent is extended or adjusted under 35 U.S.C. 154(b) by 0 days.

(21) Appl. No.: 15/129,652

(22) PCT Filed: Mar. 31, 2014

(86) PCT No.: PCT/CN2014/074446
§ 371 (c)(1),
(2) Date: Sep. 27, 2016

(87) PCT Pub. No.: WO2015/149244
PCT Pub. Date: Oct. 8, 2015

(65) Prior Publication Data
US 2017/0144689 A1    May 25, 2017

(51) Int. Cl.
*B60H 1/00* (2006.01)
*B62D 1/06* (2006.01)
(52) U.S. Cl.
CPC ......... *B62D 1/065* (2013.01); *B60H 1/00292* (2013.01); *B60H 1/00478* (2013.01)
(58) Field of Classification Search
CPC .. B60H 1/00; B60H 1/00007; B60H 1/00021; B60H 1/00292; F25B 21/00; F25B 21/02; F25B 2321/02
See application file for complete search history.

(56) References Cited

U.S. PATENT DOCUMENTS 2,835,777 A    5/1958   Gates et al.
3,876,844 A    4/1975   Scherenberg
(Continued)

FOREIGN PATENT DOCUMENTS

CN    1519160 A    8/2004
CN    1822977 A    8/2006
(Continued)

OTHER PUBLICATIONS

International Search Report from the State Intellectual Property Office of the People's Republic of China for Application No. CN/2014/074446, dated Nov. 28, 2014.
(Continued)

*Primary Examiner* — Brian M King
(74) *Attorney, Agent, or Firm* — The Dobrusin Law Firm, P.C.

(57) ABSTRACT

A climate control device (15) for influencing at least one climatic parameter of a handle (5) of a steering device (2), the climate control device (15) having an air moving device (21) for providing a stream of air, a handle distributor (26) for distributing a stream of air towards at least a part of the handle (5). It is planned that the air moving device (21) as well as the handle distributor (26) can be or are mounted to a static area, which remains static in relation to adjustment movements of the steering device (2), the handle distributor (26) has at least one air outlet (35,35') to generate a stream of air from the handle distributor (26) at the static area towards the handle (5).

20 Claims, 2 Drawing Sheets

(56) References Cited

U.S. PATENT DOCUMENTS

| | | | | |
|---|---|---|---|---|
| 4,562,957 | A | * | 1/1986 | Nakagawa .......... B60H 1/00292 |
| | | | | 219/202 |
| 4,640,340 | A | | 2/1987 | Noda et al. |
| 4,679,730 | A | | 7/1987 | Uchida |
| 4,993,281 | A | | 2/1991 | Miller |
| 5,850,741 | A | | 12/1998 | Feher |
| 5,948,347 | A | | 9/1999 | van Jaarsveld et al. |
| 6,007,420 | A | | 12/1999 | Harm et al. |
| 6,012,297 | A | * | 1/2000 | Ichishi .............. B60H 1/00871 |
| | | | | 165/203 |
| 6,298,750 | B1 | | 10/2001 | Kerner et al. |
| 6,481,312 | B1 | * | 11/2002 | Wissel ................. B62D 1/065 |
| | | | | 74/552 |
| 6,533,184 | B1 | | 3/2003 | Kim |
| D559,158 | S | | 1/2008 | Garcia |
| 7,614,682 | B1 | | 11/2009 | Major et al. |
| 7,908,941 | B2 | | 3/2011 | Menaldo et al. |
| 2002/0060722 | A1 | | 5/2002 | Axtell et al. |
| 2002/0166407 | A1 | | 11/2002 | Germuth-Loffler et al. |
| 2004/0168540 | A1 | | 9/2004 | Weiss |
| 2006/0033628 | A1 | | 2/2006 | Duval |
| 2006/0121843 | A1 | | 6/2006 | Koval |
| 2007/0101728 | A1 | | 5/2007 | Ruetz |
| 2009/0000311 | A1 | * | 1/2009 | Kmetz ............... B60H 1/00478 |
| | | | | 62/3.61 |
| 2009/0114368 | A1 | | 5/2009 | Niwa et al. |
| 2010/0274396 | A1 | * | 10/2010 | Yang ................. B60H 1/00385 |
| | | | | 700/278 |
| 2010/0288073 | A1 | | 11/2010 | Shin et al. |
| 2011/0272131 | A1 | | 11/2011 | Mikat |

FOREIGN PATENT DOCUMENTS

| | | |
|---|---|---|
| CN | 102815183 A | 12/2012 |
| CN | 202966398 U | 6/2013 |
| CN | 203111289 U | 8/2013 |
| DE | 7149043 U | 4/1972 |
| DE | 2430553 A1 | 1/1976 |
| DE | 102009037670 A1 | 2/2011 |
| EP | 1783029 A1 | 5/2007 |
| EP | 2065234 A1 | 6/2009 |
| EP | 2065290 A1 | 6/2009 |
| FR | 2922178 A1 | 4/2009 |
| GB | 2362203 A | 11/2001 |
| JP | S56-133243 U | 10/1981 |
| JP | S57-161506 U | 10/1982 |
| JP | S58-170664 U | 10/1983 |
| JP | S60-215414 A | 10/1985 |
| JP | S62-128879 A | 6/1987 |
| JP | H02-120216 U | 9/1990 |
| JP | H10-230857 A | 9/1998 |
| JP | 2006176037 A | 7/2006 |
| JP | 2007-331794 A | 12/2007 |
| WO | 03/047942 A1 | 6/2003 |

OTHER PUBLICATIONS

Opinion According to the Notification of Reasons for Refusal from the Korean Intellectual Property Office for KR Application No. 10-2016-7029777, dated Apr. 30, 2018.

Notification of Reason for Refusal from Japan Patent Office for JP Application No. 2016-559933, dated Oct. 3, 2017.

Search Report by Registered Searching Organization from Japan Patent Office for JP Application No. 2016-559933, dated Sep. 22, 2017.

First Office Action from The State Intellectual Property Office of People's Republic of China for CN Application No. 2015-10032527.7, dated Aug. 25, 2016.

First Search from The State Intellectual Property Office of People's Republic of China for CN Application No. 2015-10032527.7, dated Aug. 15, 2016.

* cited by examiner

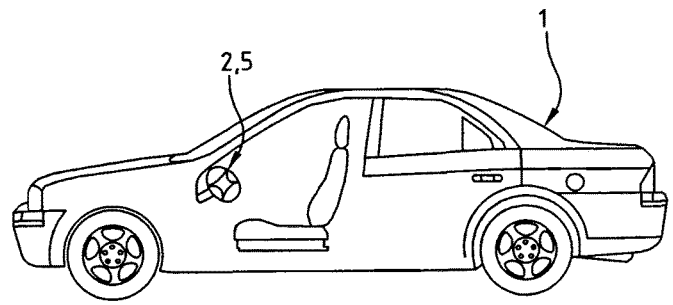
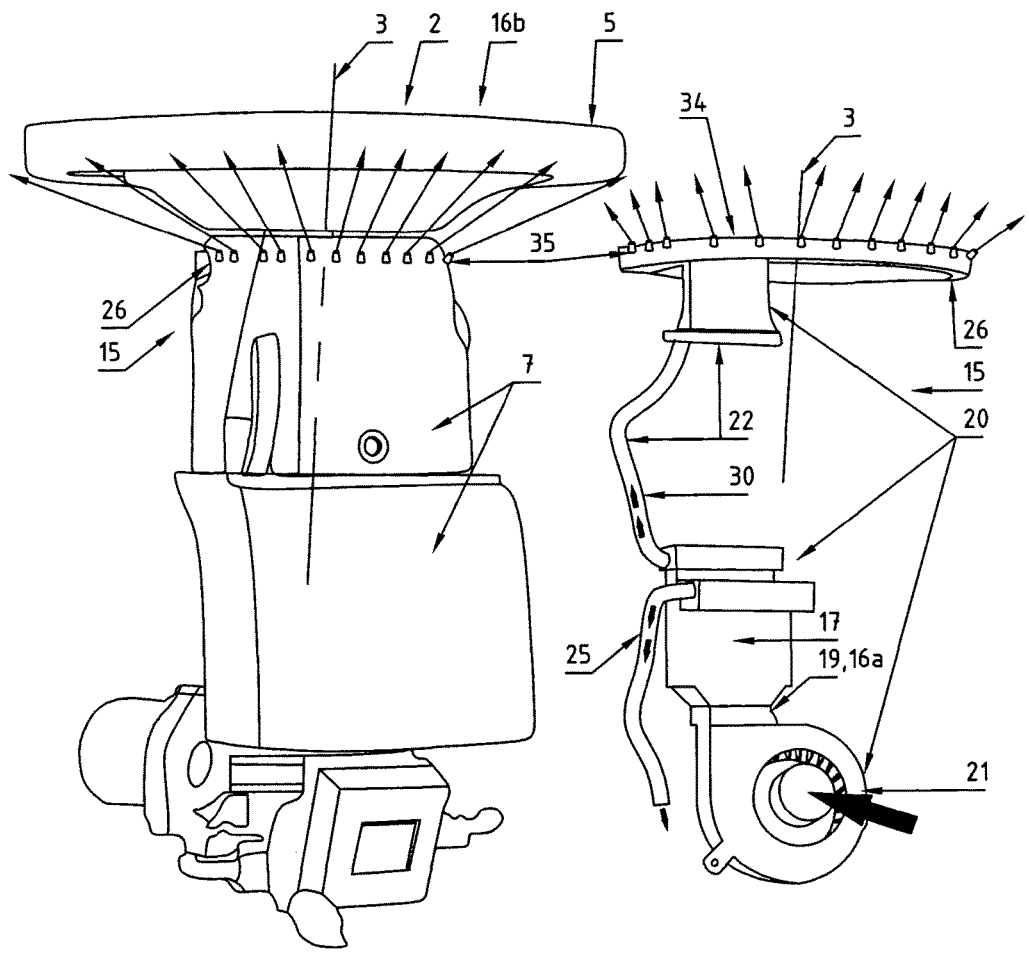
Fig. 1
Fig. 2    Fig. 3

HEATING AND COOLING DEVICE FOR HANDLES

BACKGROUND OF THE INVENTION

An object according to the present invention is a heating and cooling device for handles and steering mechanisms for influencing at least one climatic parameter. It can, for example, be used in the heating, cooling or ventilation of handles of vehicle doors, steering wheels or control sticks.

PRIOR ART

It is known from U.S. Pat. No. 5,850,741 to cool a steering wheel by integrating heat pipes into the steering wheel. As the steering wheel has to meet a number of critical conditions, like crash-safety, stability, good grip for hands of different size or strength, it is difficult to put such a system into practice.

SUBJECT OF THE INVENTION

With this as background, a technical concept according to claim 1 is suggested.

The present teachings herein provide for a handle, vehicle or steering mechanism, equipped with at least one device according to any of the teachings herein.

The invention relates to a device for influencing at least one climatic parameter. If the device for influencing a zone to be gripped is provided, then surfaces touched by the user, especially handles, can be suitably temperature-controlled, especially steering wheels, door handles, steps, operating handles of machines, etc.

If the device has or is a heating, ventilation or cooling device, then, depending on the requirement, the temperature, the humidity or the air composition at the handle can be adjusted.

In addition, the invention relates to a handle, a vehicle or a steering device. If these are equipped with a device described above, this improves its capacity for use under climatically unfavorable conditions.

Additional advantageous embodiments can be gleaned from the additional claims and the specification that follows.

The present invention especially relates to a climate control device 15 for influencing at least one climatic parameter of a handle 5 of a steering device 2, the climate control device 15 having an air moving device 21 for providing a stream of air and
a handle distributor 26 for distributing a stream of air towards at least a part of the handle 5.

It is suggested that the air moving device 21 as well as the handle distributor 26 can be or are mounted to a static area, which remains static in relation to adjustment movements of the steering device 2
the handle distributor 26 has at least one air outlet 35, 35' to generate a stream of air from the handle distributor 26 at the static area towards the handle 5.

This allows e. g. rotation and ventilation of a handle without integration of voluminous parts into the handle.

It is further suggested that the climate control device 15 is provided with at least one thermoelectric device, representing at least a part of a temperature-control device 17, and at least a first air path, which is provided for moving a first air stream along a first side of the thermoelectric device on its way to the handle distributor 26.

It can be preferred that the climate control device 15 is provided with at least one thermoelectric device, representing a temperature-control device 17,
at least a first air path is provided for moving a first air stream along a first side of the temperature-control device 17.

This allows efficient cooling or heating of the distributed air.

A handle, vehicle, or steering mechanism, equipped with at least one climate control device 15 provides good thermal comfort, while ensuring safety operation and compact packaging.

FIGURES

In what follows, the particulars of the invention are explained. These embodiments should make the invention understandable. However, they are of only an exemplary nature. Naturally, within the framework of the invention defined by the independent claims, certain individual or multiple features described can be left out, altered or supplemented. Also, the features of differing embodiment forms could be combined with each other. What is decisive is that the concept of the invention is implemented in its essence. If one feature is to be implemented at least partially, then it includes this feature being implemented fully also, or being essentially implemented in full. "Essentially" especially means that the implementation permits the desired feature to be attained to a perceptible degree. This can especially mean that a corresponding feature is attained at least by 50%, 90%, 95% or 99%. If a minimum amount is indicated, then naturally more than this minimum amount can also be used. If the number of a component is indicated by at least one or by indefinite article, then this especially includes embodiment forms also with two, three or some other plurality of components. What is described for one object can also be applied for the preponderant part of the totality of all other objects identical in nature. If nothing otherwise is indicated, intervals include their end points. In what follows, reference is made to:

FIG. 1 illustrates a vehicle 1 with a heated or cooled steering device in a partial longitudinal section.

FIG. 2 illustrates a steering device from FIG. 1, in a side view with climate control device 15 under a cover 7.

FIG. 3 shows the climate control device of FIG. 2 with a handle distributor 26 with a plurality of air openings 35 (schematic view with steering wheel and covers removed).

SPECIFICATION

Figure 4:
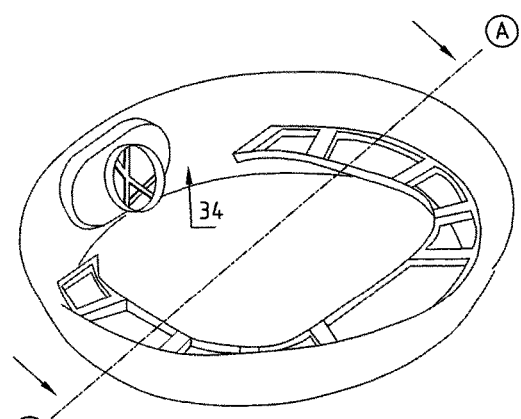
FIG. 4 is a side-top view on a second type of handle distributor with a lengthy air gap as air opening.

The invention related especially to a vehicle 1 as per FIG. 1. A vehicle means a device for transport of persons and/or freight, such as vehicles on land, water, railways and in the air, especially aircraft, ships and automotive vehicles.

The invention additionally relates to a steering device 2, such as steering wheels of motor vehicles as per FIG. 2, control sticks or aircraft or drag links of motorcycles.

Preferably the at least one control mechanism has a pivot pole 3. Pivot pole means the reference point or the reference axis about which a steering mechanism is moved to generate a steering signal. Examples are a so-called front end for a motorcycle steering bar or the steering wheel cup with a steering wheel, a centering point with a multidimensional-operation control stick or some other reference point with a nonrotary-operating steering system such as slide controls.

Preferably the at least one steering mechanism has at least one handle 5. Handle means a device for grasping and applying adjustment forces, especially for manual adjustment of steering devices, of doors, or for operation of motors. Examples are steering handles on motorcycles or steering wheel rings on steering wheels. Especially suited for this are knobs, rods or annular or arc-shaped round profiles made for example of wood, plastic or metal.

In addition, the invention also relates to a climate control device 15. Climate control device means an object that is suited to influence an area to be influenced with regard to at least one climatic parameter, for example for heating, ventilation, moisturizing or removal of moisture, and/or cooling.

Preferably at least one climate control device 15 has at least one temperature-control device 17. Temperature-control device means a device which serves for deliberate temperature control of a user or of an object to be heated, especially for raising, maintaining or lowering the temperature, such as heating, cooling or ventilating devices.

In addition, the invention relates to a heating device 16, which preferably represents the temperature control device 17 or a component part of it. A heating device means a device that provides thermal energy for specific heating of its surroundings, and emits that energy conductively, convectively and/or through thermal radiation to its surroundings. Examples are devices with at least one electrical resistance heater, a heat pump, a radiator, or a heating spiral, with multiples of these components, also of differing types, also possibly being present. It is favorable if a planar heating element 16b is provided in a jacket for heating a handle surface and additionally a Peltier element 16a or a PTC heating module is provided in an air flow for heating an air flow directed to the steering device 2.

Preferably at least one heating device 16 has at least one heating resistor for direct or indirect heating of a handle. Heating resistor implies an ohmic resistance or some other electrical component which converts electrical into thermal energy when current passes through. Examples are a plurality of heating sections made of carbon fibers, PTC heating modules connected in an air flow, layers made of an electrically conducting plastic, metal foils such as those made of aluminum or individual large-area heating sections made of metallic strands, especially in a grip zone of a surface of a handle.

Preferably at least one temperature-control device has at least one cooling device 19 for removal of excess thermal energy, especially through insolation. Cooling device means a device to lower the temperature of a surface to be cooled or an object to be cooled, such as thermal electric devices like Peltier elements, thermal conduction pipes or ventilation devices such as fans and other ventilators. A position at a distance from temperature-controlled zones promotes simple assembly and reduced structural space, for example in the direction of flow immediately behind a fan, especially close to, or in, a pivot pole of the steering mechanism. Fans with integrated Peltier modules are favorable for a modular combination of the fan and cooling device.

Preferably at least one heating or cooling device has at least one ventilation device 20. Ventilation device means a device that can be used for deliberate alteration of the air composition or the air flows in a specific two-dimensional or three-dimensional area.

Preferably at least one ventilation device 20 has at least one air moving device 21. Air moving device means a device for moving of air. Examples are air supply devices like fans, especially a radial ventilator as or an onboard air conditioner. The air moving device 21 is mounted in a zone, which is static in relation to an adjustment movement of a steering device 2.

Preferably at a discharge side of the air moving device 21 a temperature control device 17 is provided. It could also be provided or before the air moving device, within or attached to an air guidance device 22 or further along an air path away from the air moving device 21. That temperature-control device 17 could be a first heat resistor, e. g. a PTC heater, mounted to heat the air stream of the air moving device 21. But preferably the temperature control device 17 is a thermoelectric device 16a to selectively heat or cool discharged air. Preferably the air moving device 21 is connected to one side of the thermoelectric device 16a. This allows providing an air stream with heating or cooling energy. Preferably the air path exhibits a switching device to direct the stream of air selectively towards the cool or warm side of the thermoelectric device, dependent upon the desired temperature.

Preferably at least one ventilation device 20 or climate control device 15 has at least one air guidance device 22. Air guidance device means any device, which can guide air in at least one direction between an air moving device and a zone to be air conditioned or along a zone to be ventilated. This can be e.g. pipes or flexible tubes.

Preferably an air guidance device 22 has at least one connecting device 30 to connect an air moving device 19 and a handle distributor 26 for distributing air to or near the handle. Preferably it is exhibits one or more tubes, e.g. made of a flexible, air-tight material.

Preferably a ventilation device 20 and/or an air guidance device 22 exhibits at least one handle distributor 26 for at least partly ventilating a handle. "Handle distributor" means any device for collecting, distributing and/or directing air from, toward or along the handle, for example, by means of one or more pipes, which have at least one or more gaps or ventilation openings. The handle distributor 26 is preferably not integrated into or fixed to the handle. Instead, the handle distributor 26 is provided outside of the handle and separated therefrom. Preferably the handle distributor 26 is mounted to a static area. This area remains static in relation to the adjustment movements of the steering wheel, and does not move with any turning or other control movements of the handle in operation.

Preferably a handle distributor 26 has at least one distribution channel 34, to provide (or collect) air along at least a part of the handle distributor 26. It is preferably a channel, which at least partly forms a circular or rectangular loop around the axis of the pivot pole 3. Preferably a handle distributor 26, a distribution channel 34 and/or such a loop forms a hollow ring or its ends are near each other, preferably seamlessly interconnected with each other. A handle distributor 26 and/or a distribution channel 34 is preferably provided with a rectangular, polygon, round or other open flow cross-section.

Preferably a handle distributor 26 and/or a distribution channel 34 have at least one air outlet 35.

Figure 5:
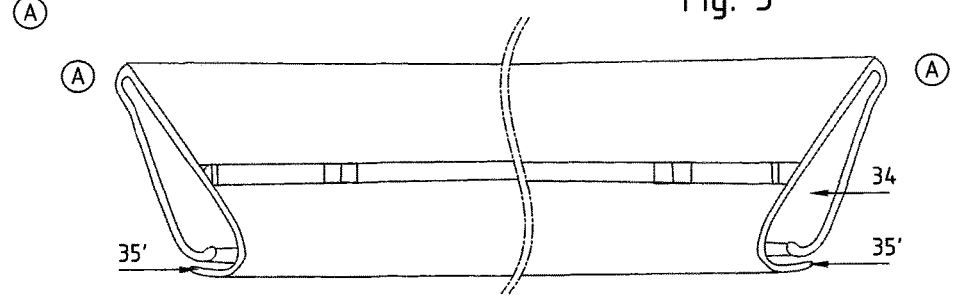
FIG. 5 is an enlarged cross section of the handle distributor of FIG. 4.

That air outlet 35 can be a long gap 35' like in FIG. 5. Such an outlet 35 is preferably arranged at least partly alongside a handle 5 and/or a moving path of a handle 5, when moved for operation. There could also be two (not shown) or more lengthy gaps. They could be distributed around or at least at the upper half of the steering wheel. "Upper" means the half-circular section of the circular steering wheel, which is farer away from the floor. A gap 35' is preferably arranged at least partly along or roughly in parallel to an outer circumference of a steering wheel. Preferably a gap 35' is arranged in a distance from the handle 5, preferably 5-30 cm away, preferably 10-20 cm. Gaps 35' are distributed preferably 120-360 degree around the axis of the pivot pole 3. So in some applications a gap 35' has at least roughly the form of a ring-like or square-like opening, concentrically arranged relative to the axis of the pivot pole 3, so with its center arranged on the pivot pole 3 of the steering device 2. It is positioned between the steering wheel and an instrument panel, preferably in one plain. It is open at least partly in a radial direction pointing away from the axis of the pivot pole 3.

Figure 6:
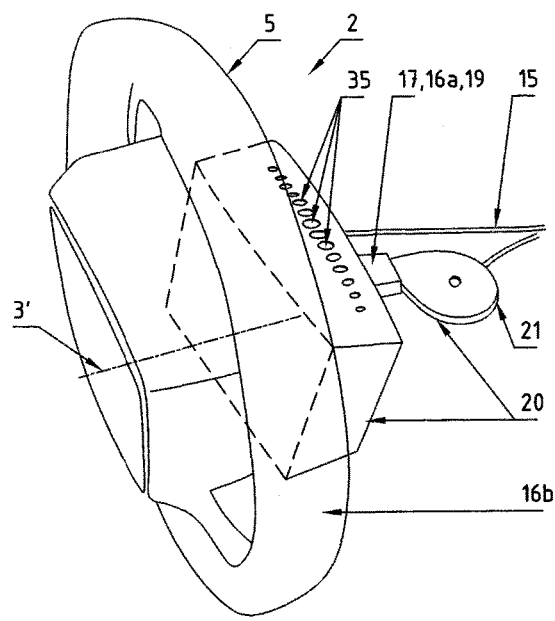
FIG. 6 is a perspective view of a steering device with a variation of the handle distributor of FIG. 3 as a third type of handle distributor, having nozzles visible embedded in a housing of the handle distributor.

Instead or in addition to one or more long gaps 35', in some applications there are one or more air point-like outlets 35 as in FIG. 2, 3 or 6. Preferably a multitude of such outlets 35 is preferably arranged at least partly alongside a handle 5 and/or a moving path of a handle 5, when moved for operation. They are preferably arranged around or at least at the upper half of the steering wheel, at least partly along or on a line roughly in parallel to an outer circumference of a steering wheel. Preferably an outlet 35 is arranged in a distance from the handle 5, preferably 5-30 cm away, preferably 10-20 cm. Outlets 35 are distributed preferably 120-360 degree around the axis of the pivot pole 3.

Independent of the shape of an air outlet 35 (including gaps 35'), the air outlet 35 is preferably designed to direct a stream of air efficiently towards the steering wheel and/or hands of a driver. Therefore the outlet 35 is preferably a nozzle or a nozzle-like gap. This causes the flow of air to exit the outlet 35 with high speed, which in turn creates an underpressure in the atmosphere around the discharged air stream. This causes the surrounding air to follow the discharged air, thus enlarging the moved air volume significantly beyond the originally transported mass. To ensure such a high speed of air, it is important to speed up the air, while it passes the outlet nozzle. This can be ensured e.g. by an open cross-section area of the handle distributor 26 (and/or the distribution channel 34), which is at least as large as the overall cross-section area of (all) the outlets 35. Preferably the cross-section of the channel 34 outweighs the cross-section of the outlets 35 by a ratio of 1.1, better 2 or 5 or even more. This leads to an increase of speed within the nozzles of 10%, 100% or respectively more compared to the speed of air within the channel 34. Preferably the air leaves an outlet 35 with a speed of at least 20 km/h, preferably at least 40 km/h.

Preferably at least one outlet 35 measures between 1 mm and 15 mm in diameter or in breadth (perpendicular to a lengthy gap). Preferably that measure is between 2 mm and 8 mm.

The direction, in which the stream or streams of air from the outlet or outlets 35 towards the handle 5 is discharged, is preferably in an angle relative towards the axis of the pivot pole 3. This avoids blowing air into the face of a user, as a direction in parallel to the axis would do. The stream of air is preferably further in an angle relative towards the plain of the steering wheel. This allows to arrange the handle distributor 26 very close to the steering wheel, but still on a static area, e.g. on the instrument panel. So the resulting air stream or stream forms an umbrella-like air flow, which reaches the hand of a user, but not his face.

Any eventual exhaust air of a thermoelectric device 16a from a second side of the thermoelectric device is discharged via a discharge tube 25 to a place, where it does not disturb, e. g. in the foot area of a cabin or outside of the vehicle 1.

The invention claimed is:
1. A climate control device comprising:
an air moving device;
a handle distributor located downstream from the air moving device;
a connecting device configured to enable fluid communication between the air moving device and the handle distributor;
at least one thermoelectric device being at least a part of a temperature-control device and dispensed between the air moving device and the handle distributor,
at least a first air path along a first side of the at least one thermoelectric device;
wherein the air moving device as well as the handle distributor are configured to be mounted to a static area along a pivot pole, between a steering device and an instrument panel of a vehicle, so that the handle distributor is precluded from rotational movement caused by adjustment movements of the steering device while the climate control device influences at least one climatic parameter of a handle of the steering device;
wherein the air moving device provides a stream of air, which is conditioned by the at least one thermoelectric device, that fluidly communicates with the handle distributor;
wherein the handle distributor has at least one air outlet to generate the stream of air from the handle distributor at the static area towards the handle;
wherein the handle distributor is arranged as a continuous loop, which includes a distal perimeter, the distal perimeter configured to have a shape contouring a perimeter of the pivot pole;
wherein the at least one air outlet is a series of outlets arranged, at regular intervals around the distal perimeter of the handle distributor, extending along an arc no less than 120 degrees around the distal perimeter of the handle distributor.

2. The climate control device according to claim 1, wherein the at least one air outlet is arranged 5-30 cm away from the handle.

3. The climate control device according to claim 1, wherein the at least one air outlet is arranged 10-20 cm away from the handle.

4. The climate control device according to claim 1, wherein the series of outlets are arranged at least at an upper half of the steering device.

5. The climate control device according to claim 1, wherein the series of outlets are configured to all be a uniform distance from the handle.

6. The climate control device according to claim 1, wherein the at least one air outlet is a nozzle having a smaller cross-section than a cross-section of the handle distributor; wherein the stream of air passes through the at least one air outlet at a higher speed than air passing through the handle distributor.

7. The climate control device according to claim 1, wherein the at least one air outlet directs the stream of air at an angle relative to a longitudinal axis of the pivot pole such that the stream of air communicates directly with the handle.

8. The climate control device according to claim 1, wherein exhaust air from the at least one thermoelectric device is discharged via a discharge tube, wherein the discharge tube is configured to discharge in a foot area or outside the vehicle.

9. The climate control device according to claim 1, wherein a path switching device selectively directs the stream of air to the first side or a second side of the at least one thermoelectric device so that air is selectively heated or cooled.

10. The climate control device according to claim 1, wherein the at least one air outlet is at least one gap extending continuously, in an arc, around a distal perimeter of a distribution channel.

11. The climate control device according to claim 10, wherein the at least one gap extends no less than 120 degrees around the distal perimeter of the handle distributor.

12. The climate control device according to claim 1, wherein the handle distributor is configured to be concentric and centered to the pivot pole.

13. The climate control device according to claim 1, wherein the handle distributor defines a distribution channel having a rectangular, polygon, round, or other open flow cross-section.

14. The climate control device according to claim 1, wherein the series of outlets are arranged on a plane configured to be parallel to an outer circumference of the handle.

15. The climate control device according to claim 6, wherein the cross-section of the handle distributor, the cross-section being along a plane perpendicular to a plane encompassing the distal perimeter of the handle distributor, outweighs the cross-section of the at least one air outlet, the cross-section defining a profile of the at least one air outlet through which air flows, by a ratio of 1:2 or more.

16. The climate control device according to claim 10, wherein the at least one gap extends, in an arc, around the distal perimeter of the distribution channel.

17. A climate control device comprising:
an air moving device;
a handle distributor having at least one air outlet;
a connecting device that enables fluid communication between the air moving device and the handle distributor;
at least one temperature control device located between the air moving device and the handle distributor;
at least a first air path along the at least one temperature control device;
wherein the climate control device is configured to be mounted to a static area along a pivot pole, between a steering device and an instrument panel of a vehicle, so that the air moving device and the handle distributor remain static in relation to adjustment movements of the steering device so that the climate control device influences at least one climatic parameter of a handle of the steering device;
wherein the air moving device generates a stream of air, which is conditioned by the at least one temperature control device, that fluidly communicates with the handle distributor; and
wherein the handle distributor is arranged as a loop, which includes a distal perimeter, the distal perimeter configured to have a shape contouring a distal perimeter of the pivot pole.

18. The climate control device according to claim 17, wherein the at least one air outlet directs the stream of air at an angle relative to the pivot pole so that the stream of air communicates directly with the handle.

19. The climate control device according to claim 17, wherein the at least one air outlet is a series of outlets arranged at regular intervals around a circumference of the handle distributor.

20. The climate control device according to claim 19, wherein the series of outlets are arranged radially no less than 120 degrees around the distal perimeter of the handle distributor.

* * * * *